(12) United States Patent
Davydov et al.

(10) Patent No.: US 9,402,233 B2
(45) Date of Patent: Jul. 26, 2016

(54) DISTRIBUTED ANTENNA SYSTEM AND METHOD FOR ENHANCED POSITIONING

(75) Inventors: Alexei Davydov, Nizhny Novgorod (RU); Alexander Maltsev, Nizhny Novgorod (RU); Kamran Etemad, Potomac, MD (US); Gregory Morozov, Nizhny Novgorod (RU); Vadim Sergeyev, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 13/992,917

(22) PCT Filed: Dec. 16, 2011

(86) PCT No.: PCT/US2011/065542
§ 371 (c)(1),
(2), (4) Date: Jun. 10, 2013

(87) PCT Pub. No.: WO2012/121774
PCT Pub. Date: Sep. 13, 2012

(65) Prior Publication Data
US 2013/0336224 A1    Dec. 19, 2013

Related U.S. Application Data

(60) Provisional application No. 61/450,070, filed on Mar. 7, 2011.

(51) Int. Cl.
*H04W 4/02*  (2009.01)
*H04W 52/02*  (2009.01)
(Continued)

(52) U.S. Cl.
CPC ......... *H04W 52/0251* (2013.01); *H04B 7/2656* (2013.01); *H04L 5/001* (2013.01);
(Continued)

(58) Field of Classification Search
CPC ...... H04B 7/2656; H04W 4/005; H04W 4/02; H04W 28/0205; H04W 72/0486; H04W 52/0251; H04W 8/186; H04W 72/048; H04W 88/085; H04L 5/001; H04L 5/0033
See application file for complete search history.

(56) References Cited

U.S. PATENT DOCUMENTS

2003/0157943 A1 *  8/2003  Sabat, Jr. ............. H04B 7/2606
                                                        455/456.1
2010/0273506 A1    10/2010  Stern-Berkowitz et al.
(Continued)

FOREIGN PATENT DOCUMENTS

CN        101931996 A        12/2010
CN        103703385 A        4/2012
(Continued)

OTHER PUBLICATIONS

"International Application Serial No. PCT/US2011/065542, International Preliminary Report on Patentability mailed Sep. 19, 2013", 7 pgs.
(Continued)

*Primary Examiner* — Noel Beharry
*Assistant Examiner* — Ruihua Zhang
(74) *Attorney, Agent, or Firm* — Schwegman Lundberg & Woessner, P.A.

(57) ABSTRACT

Embodiments of a distributed antenna system (DAS) and method for enhanced positioning in a wireless network are generally described herein. In some embodiments, an enhanced Node-B (eNB) operates as part of a DAS that includes one or more nodes having the same cell ID as the eNB. The eNB is to transmit a UE-specific reference signal and configure one or more of the other nodes of the cell to transmit UE-specific reference signals that are distinguishable from each other and from the UE-specific reference signal that is transmitted by the eNB. The eNB may receive location estimate information from user equipment (UE) that is determined at least in part from the UE-specific reference signals. The eNB may also configure the nodes to perform cooperative OFDMA transmission techniques for the UEs operating in the cell.

22 Claims, 5 Drawing Sheets

(51) Int. Cl.
*H04B 7/26* (2006.01)
*H04W 4/00* (2009.01)
*H04W 28/02* (2009.01)
*H04W 72/04* (2009.01)
*H04L 5/00* (2006.01)
*H04W 8/18* (2009.01)
*H04W 88/08* (2009.01)

(52) U.S. Cl.
CPC ............... *H04W 4/005* (2013.01); *H04W 4/02* (2013.01); *H04W 28/0205* (2013.01); *H04W 72/0486* (2013.01); *H04L 5/0033* (2013.01); *H04W 8/186* (2013.01); *H04W 72/048* (2013.01); *H04W 88/085* (2013.01)

(56) References Cited

U.S. PATENT DOCUMENTS

| 2010/0323684 | A1* | 12/2010 | Cai et al. ..................... 455/422.1 |
| 2012/0046030 | A1* | 2/2012 | Siomina et al. ............... 455/423 |
| 2012/0176939 | A1* | 7/2012 | Qu et al. ....................... 370/255 |

FOREIGN PATENT DOCUMENTS

| KR | 102010011302 A | 10/2010 |
| WO | WO-2008115588 A2 | 9/2008 |
| WO | WO-2010107356 A1 | 9/2010 |
| WO | WO-2010151829 A2 | 12/2010 |
| WO | WO-2011003030 A1 | 1/2011 |
| WO | WO-2012121774 A2 | 9/2012 |

OTHER PUBLICATIONS

"International Application Serial No. PCT/US2011/065542, Search Report mailed Aug. 31, 2012", 3 pgs.

"International Application Serial No. PCT/US2011/065542, Written Opinion mailed Aug. 31, 2012", 5 pgs.

"Chinese Application Serial No. 201180070683.2, Office Action mailed Jan. 7, 2015", 32 pgs.

"European Application Serial No. 11860435.4, Extended European Search Report mailed Sep. 25, 2014", 8 pgs.

Ericsson, et al., "Aspects on Distributed RRUs with Shared Cell-ID for Heterogeneous Deployments", R1-110649_Shared_Cell_ID, (Feb. 17, 2011).

* cited by examiner

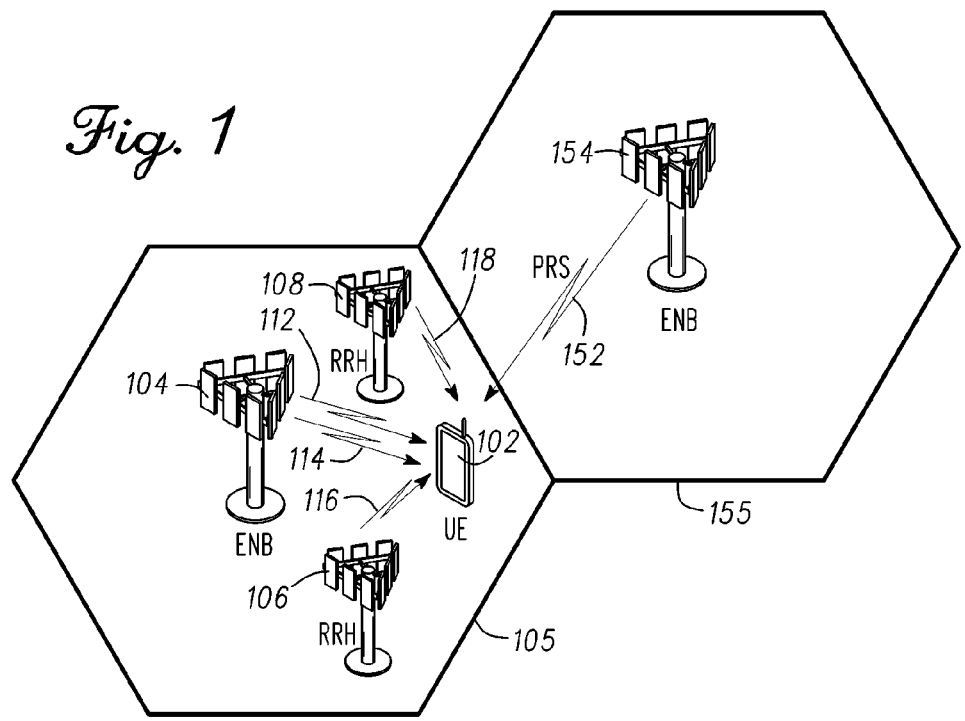
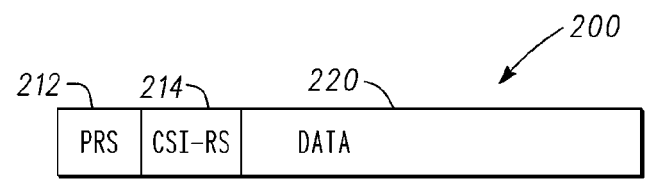
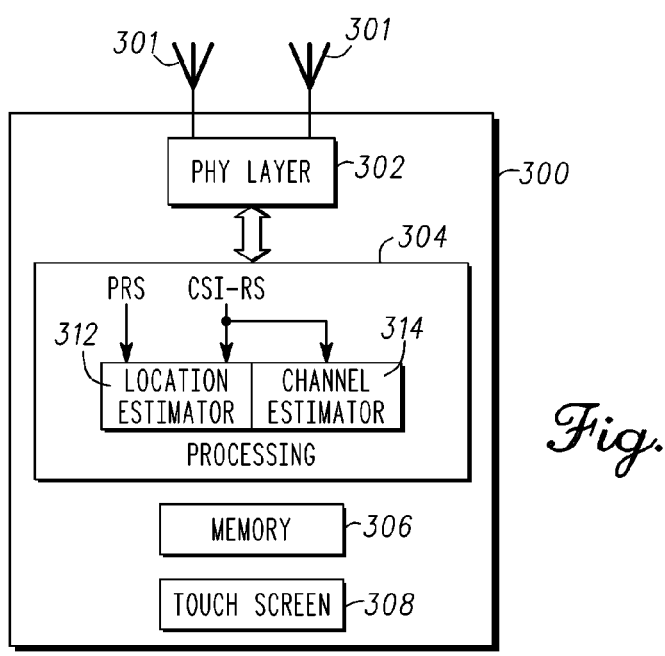

DISTRIBUTED ANTENNA SYSTEM AND METHOD FOR ENHANCED POSITIONING

PRIORITY CLAIM

This application is a U.S. National Stage Filing under 35 U.S.C. 371 from International Application No. PCT/US2011/065542, filed Dec. 16, 2011 and published in English as WO 2012/121774 on Sep. 13, 2012, which claims priority under 35 U.S.C. 119(e) to U.S. Provisional Patent Application Ser. No. 61/450,070, filed Mar. 7, 2011 (reference number P37557Z), all of which are incorporated by reference herein in their entireties.

TECHNICAL FIELD

Embodiments pertain to wireless communication networks. Some embodiments relate to location determination of mobile stations and user equipment (UE). Some embodiments relate to location services (LCS). Some embodiments relate to distributed antenna systems (DAS) including DAS in wireless networks that operate in accordance with a 3GPP Evolved Universal Terrestrial Radio Access Network (E-UTRAN) Long-Term-Evolution (LTE) network.

BACKGROUND

One issue with wireless communication networks is positioning accuracy. The accurate positioning or location determination of a mobile station or UE is helpful for configuring signal transmissions as well as helpful for providing location-based services, such as mapping and advertising, internal location services (for use by the network), and emergency location services (E-911). The accurate location of a mobile station is also helpful for lawful intercept location services to provide identification and location information of a device to an authorized public safety agency.

In some conventional wireless networks, mobile stations use the signals received from base stations of several different cells to determine their location. The accuracy of these techniques is limited due to the quality of those signals and the distance from the base stations. Enhanced 9-1-1 regulations require increased positional accuracy that may not be achievable with conventional techniques. Other conventional wireless networks may use global positioning system signals (e.g., from satellites). However, the use of satellite signals requires a separate receiver, is processing intensive and consumes significant energy.

Thus, there are general needs for systems and methods for enhanced positioning in wireless networks. There are also general needs for systems and methods for enhanced positioning that provide for positional accuracy to meet enhanced emergency 9-1-1 regulations. There are also general needs for systems and methods for enhanced positioning for improved beamforming and multiple-input multiple-output (MIMO) precoding. There are also general needs for systems and methods for enhanced positioning suitable for use in networks that use a DAS and perform cooperative transmissions.

BRIEF DESCRIPTION OF THE DRAWINGS

FIG. 1 illustrates a wireless network in accordance with some embodiments;

FIG. 2 illustrates a logical structure of a wireless frame in accordance with some embodiments;

FIG. 3 illustrates a functional block diagram of user equipment (UE) in accordance with some embodiments;

DETAILED DESCRIPTION

Figure 4A:
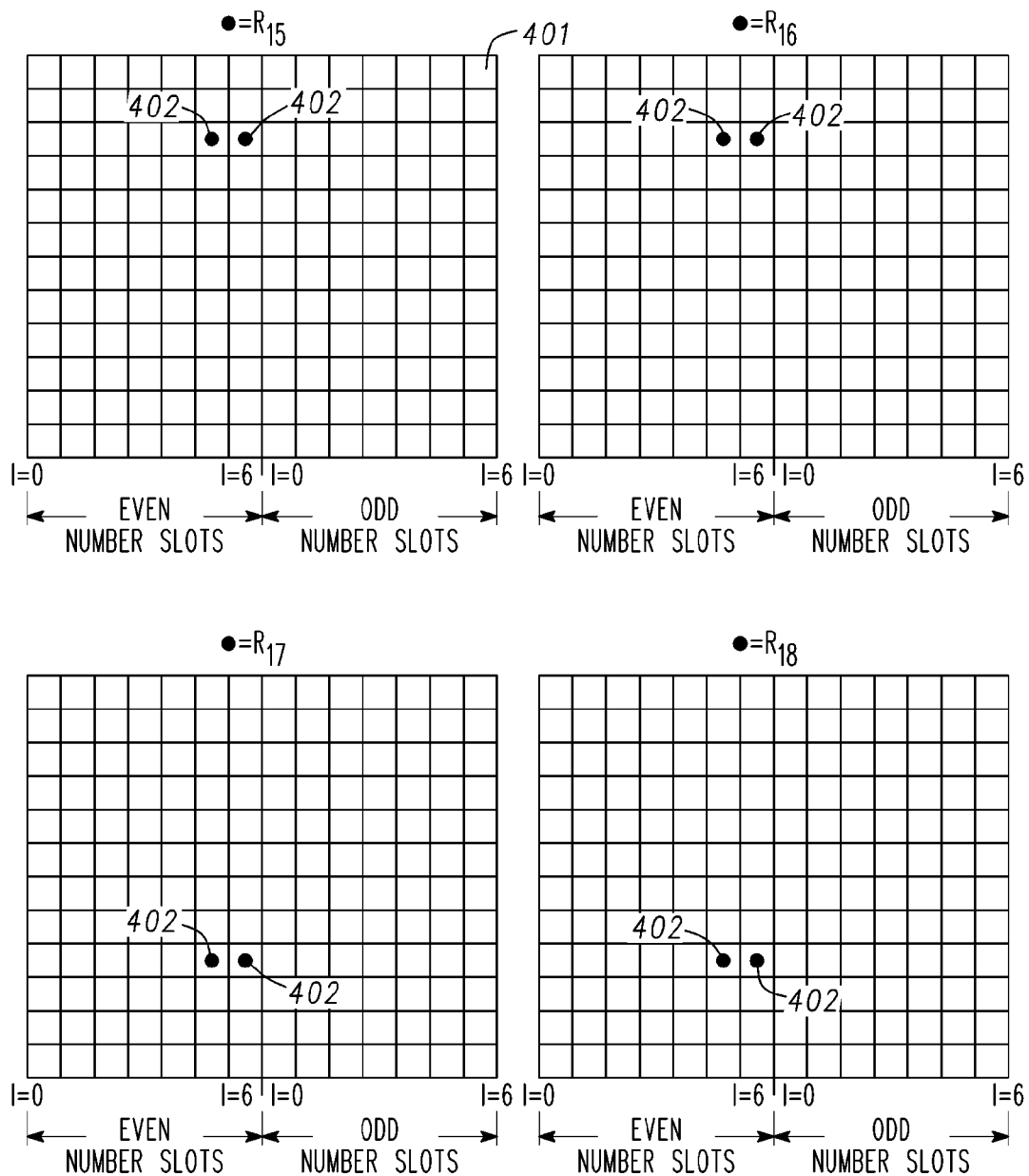
FIGS. 4A and 4B illustrate example locations of channel-state information reference signals (CSI-RS) within resource blocks in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a wireless network in accordance with some embodiments. The wireless network may include one or more base stations, such as enhanced Node-B (eNB) 104 and eNB 154, each of which is arranged to provide communication services to mobile stations within an associated cell or geographic region. The eNBs 104, 154 may be arranged to operate as part of a distributed antenna system (DAS) comprising one or more nodes. For example, eNB 104 may operate as part of a DAS that comprises one or more nodes (i.e., remote radio heads (RRHs) 106, 108) having a same cell ID and operating within the same cell 105 as the eNB 104. The eNB 104 may configure or instruct the RRHs 106, 108 to perform cooperative orthogonal frequency division multiple access (OFDMA) transmission techniques for a mobile station (such as a user equipment (UE) 102) operating in the cell 105. The cooperative OFDMA transmission techniques may include coordinated multi-point (CoMP) transmissions described in more detail below.

In some broadband multicarrier embodiments, the eNB 104 may be an Evolved Universal Terrestrial Radio Access Network (E-UTRAN) Long-Term-Evolution (LTE) base station, although the scope of the embodiments is not limited in this respect. In these broadband multicarrier embodiments, the eNB 104 and the UE 102 may communicate in accordance with an OFDMA technique. In some of these embodiments, the eNB 104 may be a macro eNB. In some other broadband multicarrier embodiments, eNB 104 may be part of a broadband wireless access (BWA) network communication station, such as a Worldwide Interoperability for Microwave Access (WiMAX) base station.

In accordance with embodiments, enhanced positioning of the UE 102 may be achieved with UE-specific reference signals that are transmitted by the RRHs 106, 108 as well as a UE-specific reference signal transmitted by the eNB 104. In these embodiments, the eNB 104 may transmit a UE-specific reference signal 114, and configure or instruct one or more of the other nodes (such as RRHs 106, 108) of the cell 105 to transmit UE-specific reference signals 116, 118. The UE-specific reference signals 116, 118 are configured to be distinguishable from each other and from the UE-specific reference signal 114 that is transmitted by the eNB 104. The UE 102 may determine, update or enhance its location estimate based, at least in part, on these signals. The eNB 104 may receive location estimate information from the UE 102. In these embodiments, each RRH 106, 108 may transmit a different UE-specific reference signal allowing the UE 102 to distinguish between the different UE-specific reference signals and to identify the source node of each UE-specific reference signal.

Accordingly, enhanced positioning may be achieved in wireless networks. This enhanced positioning may provide for increased positional accuracy that may be able to meet enhanced 9-1-1 regulations. This enhanced positioning may also provide for improved beamforming and multiple-input multiple-output (MIMO) precoding and may be suitable for use in networks that use a DAS and perform cooperative transmissions.

This enhanced positioning functionality may provide a way to determine the geographic position and/or the velocity of the UE 102 based on signal measurements. The position information may be requested by and reported to a client (e.g., an application) associated with the UE 102, or by a client within or attached to the core network. The position information may be reported in standard formats, such as those for cell-based or geographical co-ordinates, together with the estimated errors (e.g., an uncertainty) of the position and/or velocity of the UE 102 and, if available, the positioning method used to obtain the position estimate.

In some embodiments, the eNB 104 may also transmit a cell-specific reference signal 112. The location estimate information from the UE 102 may also be determined by the UE 102 based on the cell-specific reference signal 112 in addition to the UE-specific reference signals 114, 116 and 118.

In some LTE embodiments, each of the UE-specific reference signals 114, 116, 118 may be a channel state information reference signal (CSI-RS) and the cell-specific reference signal 112 may be a positioning reference signal (PRS). The CSI-RSs may be wideband signals that may cover the entire channel bandwidth, as described in more detail below, and may be used for channel estimation.

In some embodiments, the UE 102 may determine its location using the CSI-RSs (e.g., UE-specific reference signals 114, 116, 118) without the use of the PRS 112. In other embodiments, the UE 102 may use the CSI-RSs 114, 116, 118 to enhance an initial location estimate that was determined from the PRS 112 of its current cell 105 and the PRS of one or more other cells, such as cell 155.

In these embodiments, the CSI-RSs are UE specific reference signals that may have a unique signal configuration for each UE. For example, the CSI-RSs 114, 116, 118 may be scrambled with a scrambling sequence for a specific UE and to allow a UE to distinguish the CSI-RS transmitted from each node (i.e., RRHs 106, 108 and eNB 104). The PRS 112, on the other hand, may be a cell specific signal and may have a unique signal configuration for each cell or cell ID. In some LTE embodiments, the CSI-RSs may be defined by the location of the CSI-RS resource elements in resource blocks, as well as a reference signal sequence (e.g., a bit sequence) that is mapped onto these CSI-RS resource elements.

In some embodiments, the UE 102 may be informed by higher-level layers whether the UE-specific reference signals 114, 116, 118 are present in an OFDMA downlink frame. In some embodiments, frequency hopping may be applied to these downlink reference signals. In these embodiments, the frequency-hopping pattern may have a period of one frame (e.g., 10 ms).

In some embodiments, the RRHs 106, 108 may functionally operate as part of the eNB 104. In these embodiments, the eNB 104 may configure the RRHs 106, 108 to transmit distinguishable CSI-RSs as described herein. In other embodiments, the RRHs 106, 108 may operate as distinct nodes of the cell 105 and may have the same cell ID but make their own scheduling decisions. In these embodiments, the eNB 104 may instruct the RRHs 106, 108 to transmit distinguishable CSI-RSs as described herein.

In some embodiments, each of the RRHs 106, 108 may be physically separated from the eNB 104 by a distance of at least several hundred feet and are located within the cell 105 served by the eNB 104. In some embodiments, the eNB 104 may be a base station and the UEs 102 may be mobile stations or mobile communication devices. FIG. 1 is illustrated with only two RRHs 106 and 108 within cell 105 for simplicity, however a cell 105 may include up to ten or more RRHs that may be configured by the eNB 104.

In some embodiments, the eNB 104 may configure all RRHs of its cell to transmit different CSI-RSs. In other embodiments, the eNB 104 may configure a subset of RRHs in its cell to transmit different CSI-RSs. The RRHs of the subset may be selected based on their channel propagation conditions with the UE 102. In these embodiments, the RRHs with the best propagation conditions may be selected, although the scope of the embodiments is not limited in this respect.

In some embodiments, several CSI-RSs may be configured from the same cell ID. In some embodiments, the eNB 104 and each RRH 106, 108 may provide their location coordinates to the UE 102 along with the CSI-RSs. In some embodiments, an UE 102 may select nodes with good locations (e.g., having a better angular distribution) for positioning and location estimation. The use of distinguishable CSI-RS from the different nodes may allow a UE 102 to achieve a positional accuracy of between 50 and 300 meters, which may be suitable for E-911 application. In some cases, a positional accuracy of substantially less than 50 meters may be achieved (i.e., less than a meter).

In some embodiments, the CSI-RSs may be associated with particular antenna ports. In these embodiments, the CSI-RSs may be configured for different sets of antenna ports and the configuration information (the association between an RRH and antenna ports for a CSI-RS) may be communicated to the UE 102. In some embodiments, a group of two or more UEs may share the same CSI-RSs.

In some LTE embodiments, the UE 102 and eNB 104 may implement a positioning protocol, such as a LTE positioning protocol (LPP). In these embodiments, an LPP packet data unit (LPP-PDU) may be used to carry positioning-related information between the UE 102 and an enhanced service mobile location center (E-SMLC) within the core network. In these embodiments, the eNB 104, when operating as a network element of E-UTRAN, may provide measurement results for position estimation, may measure signals for a target UE, and may communicate these measurements to the E-SMLC. The E-SMLC may manage the support of different location services for target UEs, including positioning of UEs and delivery of assistance data to UEs. The E-SMLC may interact with a serving eNB (i.e., eNB 104) for a target UE (e.g., UE 102) in order to obtain position measurements for the UE 102, including uplink measurements made by the eNB 104 and downlink measurements made by the UE 102 that were provided to the eNB 104 as part of other functions such as for support of handover.

LPP messages may be carried as transparent PDUs across intermediate network interfaces using appropriate protocols (e.g., S1-AP over the S1-MME interface, NAS/RRC over the Uu interface). The LPP may be used to enable positioning for LTE using a multiplicity of different positioning methods, while isolating the details of any particular positioning method and the specifics of the underlying transport from one another.

The LPP may operate on a transaction basis between a target device and a server, with each transaction taking place as an independent procedure. More than one such procedure may be in progress at any given moment. An LPP procedure may include request/response pairing of messages or one or more unsolicited messages for the transfer of assistance data, exchange of LPP-related capabilities, or positioning of a target device according to some quality-of-service (QoS) requirement and use of one or more positioning methods. Multiple procedures, in series and/or in parallel, can be used to achieve more complex objectives (e.g., positioning of a target device in association with transfer of assistance data and exchange of LPP-related capabilities). Multiple procedures also enable more than one positioning attempt to be ongoing at the same time (e.g., to obtain a coarse location estimate with low delay while a more accurate location estimate is being obtained with higher delay).

In some embodiments, the eNB 104 and the RRHs 106, 108 may be configured for CoMP transmission and reception. CoMP transmission may include joint processing (JP) in which data for the UE 102 is available at more than one point in the CoMP-cooperating set (the eNB 104 and one or more RRHs) for a time-frequency resource. CoMP transmission may include joint transmission (JT) which includes a simultaneous data transmission from multiple points (part of or the entire CoMP-cooperating set) to a single UE or multiple UEs in a time-frequency resource. Data to a UE may be simultaneously transmitted from multiple points, e.g. to (coherently or non-coherently) improve the received signal quality and/or data throughput. CoMP transmission may also include dynamic point selection (DPS)/muting in which data transmission is from one point (within the CoMP-cooperating set) in a time-frequency resource. The transmitting/muting point may change from one subframe to another including varying over resource block pairs within a subframe. Data is available simultaneously at multiple points. These embodiments may include dynamic cell selection (DCS). In some embodiments, DPS may be combined with JT, in which case multiple points can be selected for data transmission in the time-frequency resource. A CoMP transmission may also include coordinated scheduling/beamforming (CS/CB) in which data for the UE is available at and transmitted from one point in the CoMP-cooperating set (downlink (DL) data transmission is done from that point) for a time-frequency resource but user scheduling/beamforming decisions are made with coordination among points corresponding to the CoMP-cooperating set. The transmitting points may be chosen semi-statically.

In some alternate embodiments, enhanced positioning for a UE 102 may be achieved through an advanced use of conventional LTE signals. The cell ID parameter determines a random sequence used in the signals and frequency position of the PRS. A PRS index parameter may determine the periodicity of the transmission and the offset in the period. Conventionally, these parameters may only be configured with a one-to-one correspondence, for example, using a look-up table. In these alternate embodiments, different infrastructure nodes (i.e., RRHs 106, 108 and eNB 104) with the same cell ID may transmit PRSs that are distinguishable by a UE 102. In these embodiments, the cell ID and PRS index parameter may be decoupled so that different infrastructure nodes may have the same cell ID and different PRS index parameters. In these embodiments, the PRSs from the different nodes may have the same periodicity and have different offset within the period. In some embodiments, a message in accordance with a LTE protocol may inform the UE 102 of the PRS configuration for the particular infrastructure nodes. The message may inform a UE of the cell ID, the PRS index and the location of the infrastructure node.

In some other alternate embodiments, a new set of PRSs may use scrambling codes that depend not only on the cell ID, but on additional parameters to allow making these PRSs RRH-specific and/or UE-specific. These embodiments may help preserve backwards compatibility since conventional PRSs may still be transmitted, and eNBs may send this new set of PRSs in the same format as before. In this way, UEs in different cells will be able to decode them and therefore may use a more conventional positioning technique. In these embodiments, additional PRSs may be used separately within each cell.

In some embodiments, the use of distinguishable CSI-RSs and the use of distinguishable PRSs may be used in combination to enable backwards compatibility with legacy UEs while providing enhanced positioning capability for non-legacy UEs.

In some alternate embodiments, the PRS may be user-specific and may be considered a UE-specific PRS. In these embodiments, the UE-specific PRS may be unique to a UE and may use a UE-specific scrambling code as well as the source node.

FIG. 2 illustrates a logical structure of a wireless frame in accordance with some embodiments. Wireless frame 200 may include a first logical portion 212, a second logical portion 214, and a third logical portion, shown as data portion 220. Wireless frame 200 may include other logical portions that are not illustrated.

In some embodiments, the PRS 112 (FIG. 1) may be transmitted by an eNB 104 (FIG. 1) in the first logical portion 212 of the wireless frame 200, and the CSI-RSs 114, 116, 118 (FIG. 1) may be transmitted by eNB 104 and RRH 106, 108 (FIG. 1) in the second logical portion 214 of the frame 200. The eNB 104 and the RRHs 106, 108 may also concurrently transmit data in the data portion 220 of the wireless frame 200, which may be part of a cooperative transmission.

In some embodiments, the wireless frame 200 may be an OFDMA downlink subframe, and the CSI-RSs 114, 116, 118 may be concurrently transmitted by the RRHs 106, 108 and the eNB 104 in the second logical portion 214. In some of these embodiments, the PRS 112 may be a cell-specific signal and may not be transmitted by the RRHs 106, 108 when the PRS 112 is transmitted by the eNB 104. In some embodiments, the RRHs 106, 108 may refrain from transmitting a PRS at least during the first logical portion 212 of frame 200. In some embodiments, the RRHs 106, 108 may refrain from transmitting a PRS when the UE 102 is performing position using the PRS 112 from a serving eNB (i.e., eNB 104). In these embodiments, the RRHs 106, 108 may switch off their PRS during certain times.

The data portion 220 of frame 200 may comprise data for a cooperative transmission in which data is transmitted in accordance with a cooperative transmission technique by more than one node for the same UE (e.g., similar to diversity reception). This allows a UE 102 to receive the data from more than one node. In some embodiments, data for a cooperative transmission may include transmissions by the RRHs 106, 108 and the eNB 104, while in other embodiments, an eNB 104 may configure RRHs 106, 108 to transmit data for a cooperative transmission without transmissions by the eNB (i.e., only the RRHs participate in a cooperative transmission technique). In these embodiments, RRHs 106, 108 and/or eNB 104 may concurrently and synchronously transmit wireless frames, such as wireless frame 200 as part of a cooperative transmission.

Although FIG. 2 appears to illustrate that the second logical portion 214 follows the first logical portion 212 in time, and that the data portion 220 follows the second logical portion 214 in time, this is not necessarily the case as it should be noted that FIG. 2 illustrates the logical structure for the wireless frame 200. The first logical portion 212, the second logical portion 214, and the data portion 220 are transmitted within different resource elements of a frame that may utilize the same or different subcarriers and may be part of the same or different orthogonal frequency division multiplexed (OFDM) symbols of the frame. For example, in the same ODFM symbol, subcarriers may be used for both the CSI-RS and data types. In the case of a single subcarrier, one or two resource elements of a CSI-RS, for example, may be between the resource elements of data. In some example embodiments, the PRSs and CSI-RSs may occupy different OFDM symbols.

FIG. 3 illustrates a functional block diagram of user equipment in accordance with some embodiments. UE 300 may be suitable for use as UE 102 (FIG. 1). UE 300 may include physical layer circuitry 302 for transmitting and receiving signals to and from eNBs using one or more antennas 301. UE 300 may also include processing circuitry 304 that may include, among other things, a location estimator 312 and a channel estimator 314. UE 300 may also include memory 306 and a touchscreen 308.

In accordance with some embodiments, the location estimator 312 may determine a location or positioning estimate for the UE 300 using at least the UE-specific reference signals, such as CSI-RSs 114, 116, 118 (FIG. 1). In some embodiments, the location estimator 312 may also determine the location estimate using a cell-specific reference signal, such as a PRS 112 (FIG. 1). The channel estimator 314 may determine channel estimates using the UE-specific reference signals such as CSI-RSs 114, 116, 118.

In some embodiments, UE 300 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antenna 301 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, two or more antennas may be effectively separated to take advantage of spatial diversity and the different channel characteristics that may result between each of antennas 301 and the antennas of a transmitting station. In some MIMO embodiments, antennas 301 may be separated by up to $\frac{1}{10}$ of a wavelength or more.

In some embodiments, the UE 300 may include one or more of a keyboard, a display, a non-volatile memory port, multiple antennas, a graphics processor, an application processor, speakers, and other mobile device elements. The display may be a LCD screen such as touchscreen 308.

Although UE 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of UE 300 may refer to one or more processes operating on one or more processing elements.

Figure 4B:
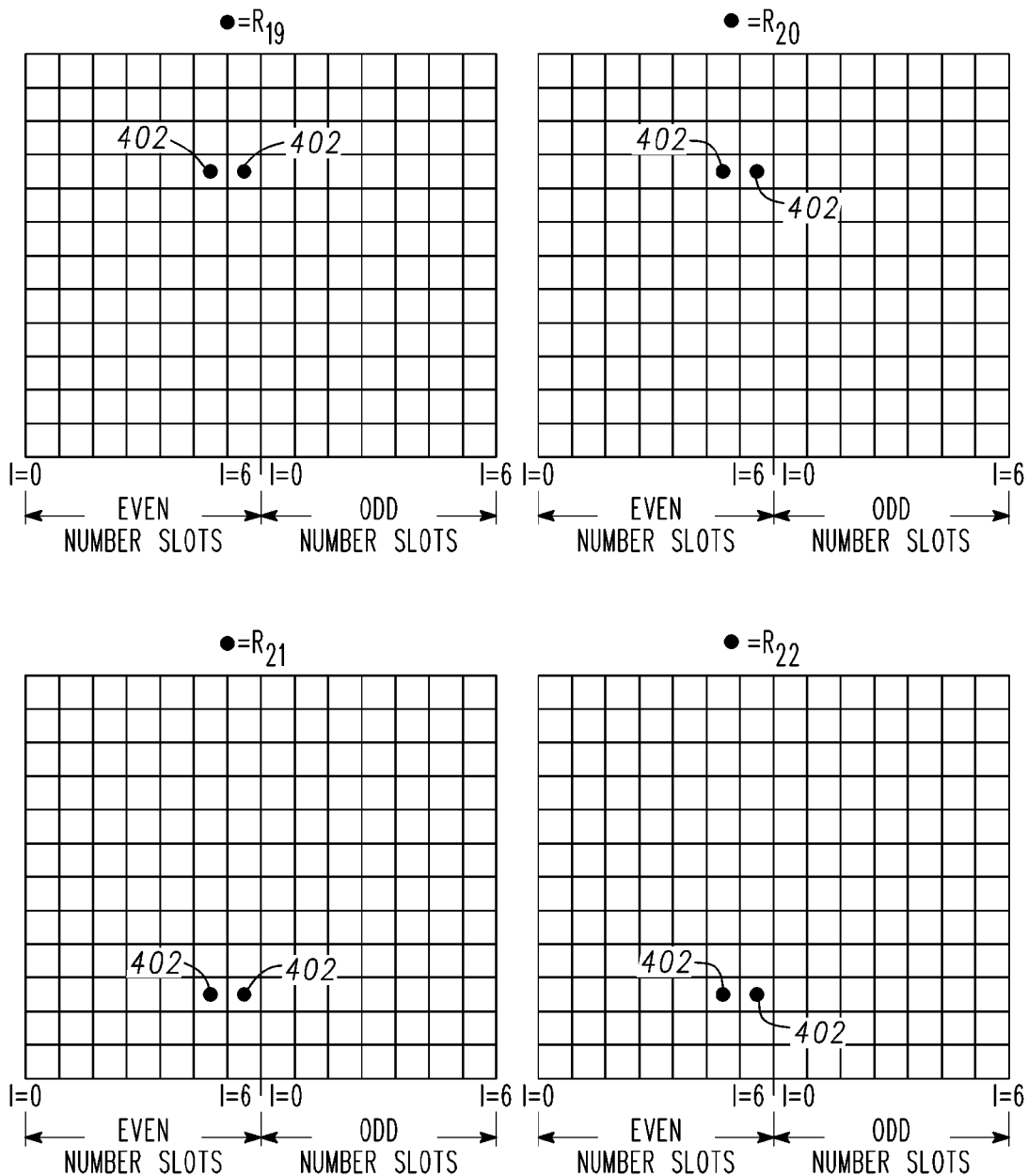

FIGS. 4A and 4B illustrate example locations of the CSI-RS within resource blocks in accordance with some embodiments. FIGS. 4A and 4B illustrate examples of some of the individual resource elements 401 that may be used for the transmission of CSI-RSs 402, such as CSI-RSs 114, 116 and 118 (FIG. 1). In the example illustrated in FIGS. 4A and 4B each resource block (RB) 400 includes a physical downlink control channel (PDCCH) in slots 0-3, and a physical downlink shared channel (PDSCH) in slots 4-6. Other configurations may also be suitable. In the examples illustrated in FIGS. 4A and 4B, each of the CSI-RS 402 may be transmitted on resource elements in a region of the PDSCH.

In some LTE embodiments, the CSI-RSs 402 may be defined by the location of the CSI-RS resource elements 401 in the resource blocks 400 (as shown in FIGS. 4A and 4B), as well as a reference signal sequence (e.g., a bit sequence) that may be mapped onto these CSI-RS resource elements 401. The reference signal sequence may be a cell-specific reference sequence (i.e., identical for all UEs in the cell). In other embodiments, the reference signal sequence may be UE-specific. In these embodiments, higher layers may configure the CSI-RS for UEs individually.

The RBs 400 illustrated in FIGS. 4A and 4B may illustrate only a portion of the channel bandwidth used for the transmission of a downlink frame, which may comprise many more RBs 400 than those illustrated. In these embodiments, the CSI-RS 402 may be wideband signals that cover the entire channel bandwidth, since they are transmitted in many RBs of a downlink frame. In this way, a UE such UE 102 (FIG. 1), can accurately estimate the channel from the CSI-RS.

In FIGS. 4A and 4B, the example locations of CSI-RSs 402 are illustrated for transmissions that use a normal-length cyclic prefix (CP) in which each resource block is shown with two sets of seven symbol slots. In embodiments that transmit with an extended cyclic prefix, different locations for the CSI-RSs may be provided in which each resource block may have two sets of six symbol slots.

In accordance with some embodiments, the eNB 104 (FIG. 1) may transmit a first CSI-RS 114 (FIG. 1) with a first UE-specific scrambling code, and configured to instruct or configure each of the RRHs 106, 108 (FIG. 1) to transmit a second CSI-RS 116, 118 (FIG. 1) with different UE-specific scrambling codes. In this way, a UE 102 (FIG. 1) is able to distinguish between the different CSI-RSs 114, 116 and 118 for location estimation.

In some embodiments, all the CSI-RSs for the same UE may be transmitted within the same resource elements 401 of a resource block 400 that is concurrently transmitted by the eNB 104 (FIG. 1) and the RRHs 106, 108 (FIG. 1). In these embodiments, all CSI-RSs 114, 116 and 118 (FIG. 1) may be transmitted concurrently in resource elements indicated with reference number 402. In some embodiments, antenna ports may be appropriately configured for different RRHs to allow the UE 102 (FIG. 1) to know which scrambling code is transmitted by which RRH.

In some embodiments, the eNB 104 is configured to transmit the first CSI-RS 114 (FIG. 1) on a first set of resource elements 401, and configured to instruct each of the RRHs 106, 108 (FIG. 1) to transmit an associated CSI-RS, at least in part, on a different set of resource elements of a resource block 400 that is concurrently transmitted by the eNB 104 (FIG. 1) and the RRHs 106, 108. In these embodiments, at least some of the resource elements for each CSI-RS 114, 116 and 118 (FIG. 1) may be orthogonal in time and frequency. In some of these embodiments, all resource elements for each CSI-RS 114, 116 and 118 may be orthogonal in time and frequency, although the scope of the embodiments is not limited in this respect.

In some alternate embodiments, the eNB 104 (FIG. 1) may transmit the first CSI-RS with a cell-specific scrambling code and may instruct each of the RRHs 106, 108 (FIG. 1) to transmit a CSI-RS with the same cell-specific scrambling code. The eNB 104 may also transmit the first CSI-RS on a first set of resource elements, and may instruct each of the RRHs 106, 108 to transmit an associated CSI-RS, at least in part, on a different set of resource elements of a resource block 400 that is concurrently transmitted by the eNB and the RRHs.

Figure 5:
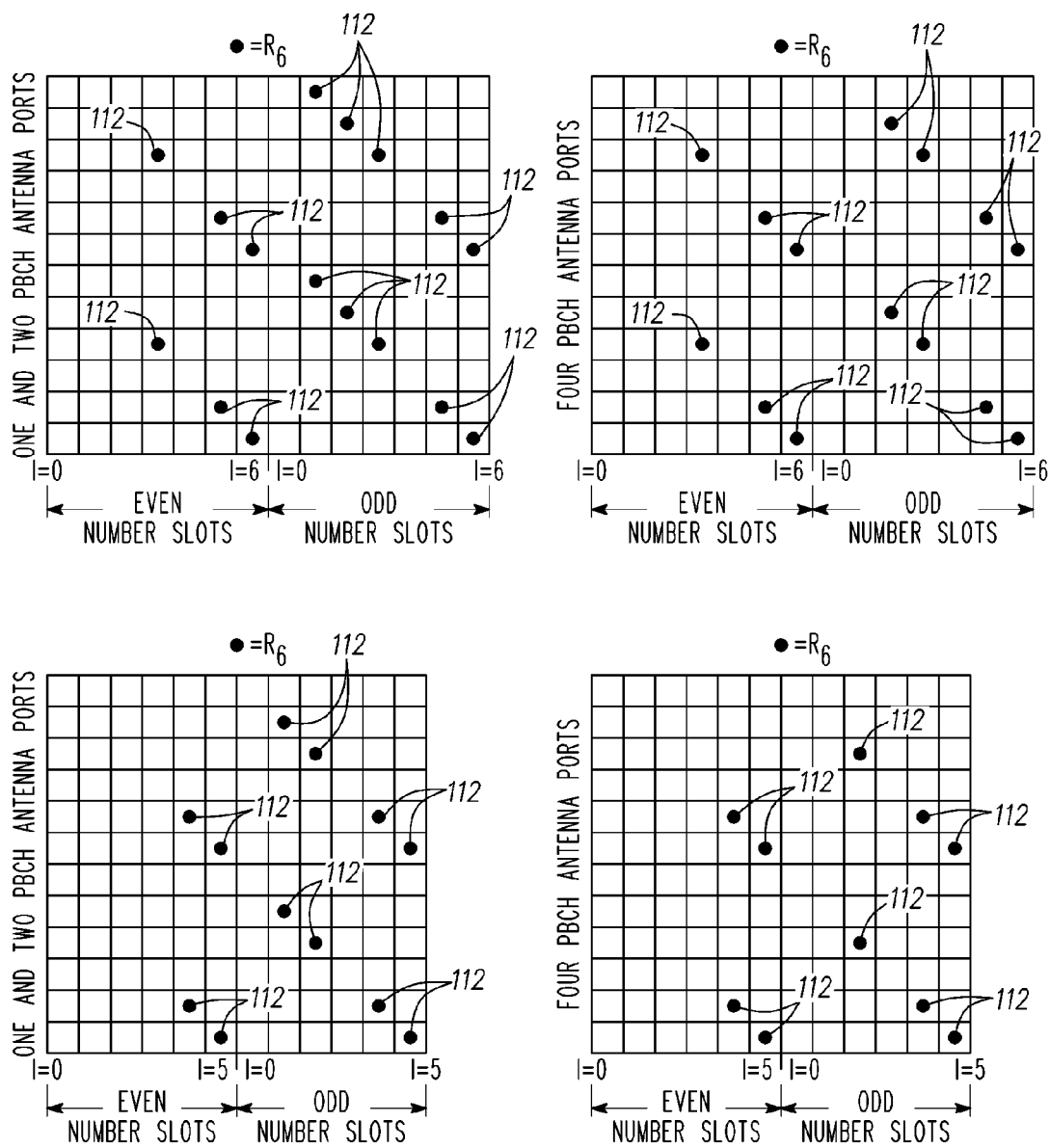
FIG. 5 illustrates example locations of positioning reference signals (PRS) in resource blocks in accordance with some embodiments.

FIG. 5 illustrates the locations of positioning reference signals (PRS) in resource blocks in accordance with some embodiments. In these embodiments, the PRS 112 (FIG. 1) may be broadcasted by an eNB. The example locations of the PRS 112 are illustrated for both normal CP transmissions and extended CP transmission. In these embodiments, the PRSs are transmitted in a broadcast manner so that each UE in the cell can receive them.

In some embodiments, the antenna patterns may provide substantially uniform coverage with the cell of each eNB, as each eNB transmits PRSs 112 within its own cell. In some LTE advanced (LTE-A) embodiments, the PRSs 112 may be directed (e.g. using one or more directional antennas and/or beamforming techniques) at an individual UE to improve the quality of reception of the PRSs.

In some embodiments, the UE 102 (FIG. 1) may perform an initial location estimate using the received PRS 112 and a PRS 152 (FIG. 1) received from a neighbor eNB (such as eNB 154 (FIG. 1) of one or more other cells 155 (FIG. 1). The UE 102 may also update and/or refine the initial location estimate using the received CSI-RS 114 (FIG. 1) from the eNB 104 (FIG. 1) and the CSI-RSs 116, 118 (FIG. 1) received from the RRHs 106, 108 of the cell 105 (FIG. 1). The UE 102 may also perform channel estimations for each channel using the CSI-RS 114 from the eNB and the CSI-RSs 116 118 from one or more of the RRHs 106, 108. The UE 102 may report the updated location estimate to the eNB 104 and may provide feedback to the eNB 104 indicative of the channel estimations for use by the eNB and the RRHs for cooperative OFDMA transmissions. In some LTE embodiments, the channel feedback may be in the form of a precoding matrix indicator (PMI) including a wideband PMI or a narrowband PMI.

In some embodiments, the location estimate of the UE 102 (FIG. 1) may be a geographic location (e.g., in geo-coordinates) or may be relevant location (e.g., a location within the cell with respect to the eNB 104 (FIG. 1)). In some embodiments, the UE 102 may determine its initial location and update the initial location using a time-of-arrival (TOA) or a time-difference-of-arrival (TDOA) techniques based on the PRS 112 (FIG. 1) and the CSI-RSs 114, 116 and 118 (FIG. 1). Other location-estimating techniques based on receipt of signals may also be used.

In some alternate embodiments, rather than providing an actual location estimate to the eNB 104 (FIG. 1), the UE 102 (FIG. 1) may provide location estimate information such as a TOA or a TDOA of the signals to the eNB 104 to allow the eNB to determine the actual location estimate of the UE 102.

In some embodiments, the eNB 104 may provide a location-based service (LBS) or location service (LCS) to the UE 102 based on the location estimate or the location estimate information.

In some embodiments, when the UE 102 (FIG. 1) is unable to accurately determine its location estimate using the CSI-RSs 114, 116 and 118 (FIG. 1), or when the UE 102 is unable to accurately update and enhance its initial location estimate using the CSI-RSs 114, 116 and 118, the eNB 104 (FIG. 1) may request one or more neighboring eNBs, such as eNB 154 (FIG. 1), to apply PDSCH muting to the CSI-RS subcarriers. In these embodiments, the application of PDSCH muting reduces interference because the neighboring eNB may refrain from transmitting on the subcarriers used by the serving eNB 104 and RRHs 106, 108 (FIG. 1) for transmission of the CSI-RSs 114, 116 and 118. In these embodiments, the UE 102 requests one or more of the neighboring eNBs to apply PDSCH muting based on the signal quality of the received CSI-RSs. In these embodiments, the eNB 104 may refrain from requesting one or more of the neighboring eNB to apply PDSCH muting when the signal quality of the received CSI-RSs meets a predetermined signal quality (e.g., a signal-to-interference and noise ratio (SINR) or a signal-to-noise ratio (SNR)). In these embodiments, eNB 104 may determine whether the positioning has been done successfully and may provide a request for PDSCH muting when the positioning had not been done successfully if desired.

In some other embodiments, when the UE 102 (FIG. 1) is unable to accurately determine its location estimate using the CSI-RSs 114, 116 and 118 (FIG. 1), or when the UE is unable to accurately update and enhance its initial location estimate using the CSI-RSs 114, 116 and 118, the eNB 104 (FIG. 1) may configure additional RRHs to transmit UE-specific references signals (i.e., CSI-RS) for use by the UE 102 for location estimate.

In some embodiments, the accuracy of positioning may be estimated theoretically or experimentally (e.g. using a lookup table) based on characteristics (e.g., the SINR) that UE 102 (FIG. 1) determines from the reference signals used for positioning, locations of the reference nodes (e.g., RRHs 106, 108 (FIG. 1)) and the estimated location of the UE 102 with respect to these reference nodes. If the estimated accuracy of the location is within the predetermined limits with the probability above certain threshold, the positioning may be considered successful for the UE 102.

In some embodiments, the eNB 104 (FIG. 1) may periodically broadcast a cell identifier (ID) that uniquely identifies its associated cell 105 (FIG. 1) as part of synchronization signals. The eNB 104 may instruct each of the RRHs 106, 108 (FIG. 1) to broadcast the same cell ID as part of the synchronization signals. In some embodiments, the cell ID may be transmitted by the eNB 104 within secondary synchronization signals (SSS). These secondary synchronization signals may be transmitted periodically (e.g., every 10 slots) in the last OFDM symbol but one in the slot. These secondary synchronization signals may occupy a few subcarriers in the center of the channel to allow receipt by UEs having different bandwidth capabilities.

In some embodiments, the secondary synchronization signals may be transmitted by the different nodes at different times. For example, each node may transmit its secondary synchronization signals while other nodes remain silent. In some alternate embodiments, all nodes in the cell including the eNB 104 (FIG. 1) and the RRHs 106, 108 (FIG. 1) may transmit the secondary synchronization signals simultaneously (i.e., a joint transmission in the same resource elements). In some other embodiments, a subset of nodes may transmit their secondary synchronization signals simultaneously, while other nodes remain silent.

Figure 6:
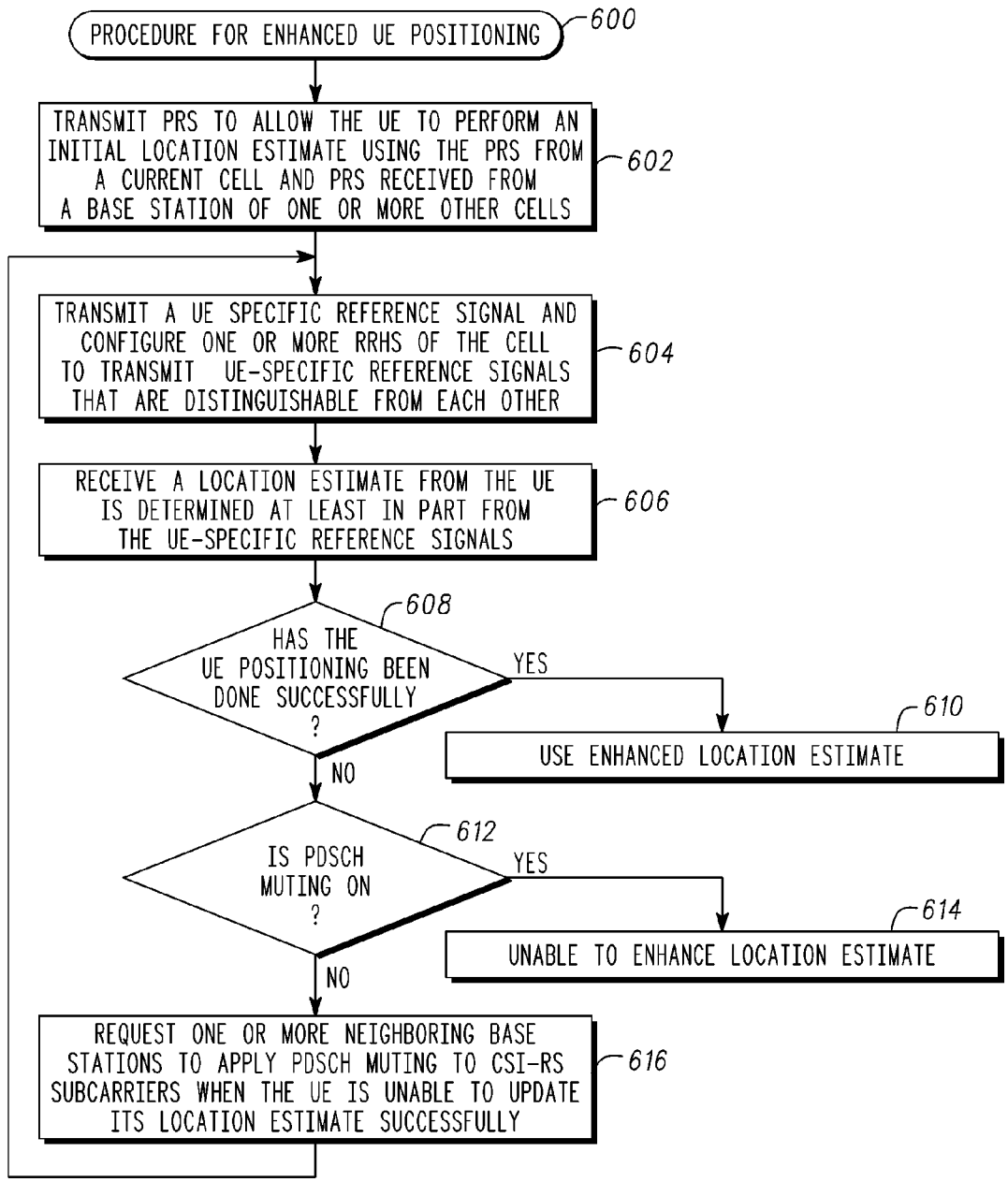
FIG. 6 is a procedure for enhanced UE positioning in accordance with some embodiments.

FIG. 6 is a procedure for enhanced UE positioning in accordance with some embodiments. Procedure 600 may be performed by a base station, such as eNB 104 (FIG. 1) for enhanced UE positioning.

In operation 602, the base station may transmit a positional reference signal, such as PRS 112 (FIG. 1), to allow a UE, such as UE 102 (FIG. 1), to perform an initial location estimate using the PRS from the current cell and one or more PRSs from other cells. This operation is optional.

In operation 604, the base station may transmit a UE-specific reference signal and may configure one or more other nodes (e.g., RRHs) of the cell to transmit UE-specific reference signals. The UE-specific reference signals may be CSI-RS that may be UE-specific and distinguishable from each other.

In operation 606, the base station may receive a location or positioning estimate from the UE 102 (FIG. 1). The location estimate may be determined from the UE at least in part based on the UE-specific reference signals. In some embodiments, a location estimate based on the PRS may be enhanced by the use of the UE-specific reference signals.

In operation 608, the base station determines if the UE positioning has been done successfully (e.g., was the UE able to use the UE-specific reference signals to determine its location or enhance or update its location?). When the UE positioning has been done successfully, operation 610 is performed. When the UE positioning has not been done successfully, operation 612 is performed. As discussed above, the accuracy of the positioning information may be reported along with the positioning estimation technique used by the UE.

In operation 610, the location estimate may be used by the base station (e.g., for providing a LCS or for configuring signals for transmission to the UE).

In operation 612, the base station determines if PDSCH muting is turned on. If PDSCH muting is turned on, operation 614 is performed. If PDSCH muting is not turned on, operation 616 may be performed.

In operation 614, the base station may determine that if the UE is unable to use the UE-specific reference signals for location determination, it may be unable to determine an enhanced location for the UE. In some embodiments, the base station may attempt to increase the positioning accuracy by increasing the number of RRHs participating by instructing additional RRHs to transmit the UE-specific reference signals for location determination. In these embodiments, the base station may select the additional RRHs with better angular distribution with respect to the UE.

In operation 616, the base station may request one or more neighboring base stations to apply PDSCH muting to the subcarriers used for transmission of the UE-specific reference signals (e.g., the CSI-RS subcarriers). Once PDSCH muting is applied, the base station may repeat operation 604 to allow a UE receive the UE-specific reference signals from the base station (e.g., eNB 104 (FIG. 1)) and the other nodes (e.g., RRHs 106, 108 (FIG. 1)) with reduced interference from neighbor nodes.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the eNB 104 (FIG. 1) and the UE 102 (FIG. 1) may include one or more processors and may be configured with instructions stored on a computer-readable storage device.

The abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An enhanced Node-B (eNB) to operate as part of a distributed antenna system (DAS) comprising one or more nodes having a same cell identifier (ID) and operating within a same cell as the eNB, the eNB arranged to:
   transmit a user equipment (UE)-specific reference signal and a cell-specific reference signal;
   configure one or more of the other nodes of a cell to transmit UE-specific reference signals, each of the UE-specific reference signals transmitted by each of the one or more of the other nodes being distinguishable from each of the UE-specific reference signals transmitted by each other node of the one or more of the other nodes and from the UE-specific reference signal that is transmitted by the eNB, the nodes comprising remote radio heads (RRHs); and
   receive location estimate information from a UE that is determined at least in part from the UE-specific reference signals and the cell-specific reference signal, wherein each of the UE-specific reference signals comprises a channel state information reference signal (CSI-RS) and the cell-specific reference signal comprises a positioning reference signal (PRS), wherein the location estimate information comprises an initial location estimate obtained using the received PRS and a PRS received from one or more other cells, an update of the initial location estimate obtained using the received CSI-RS from the eNB and the CSI-RSs received from the RRHs of the cell, and feedback indicative of channel estimations, obtained using the CSI-RS from the eNB and the CSI-RSs from one or more of the RRHs, for use by the eNB and the RRHs for cooperative orthogonal frequency division multiple access (OFDMA) transmissions.

2. The eNB of claim 1 wherein the PRS is transmitted in a first logical portion of a wireless frame, and the CSI-RSs are transmitted in a second logical portion of the frame, and
   wherein the eNB and the nodes are arranged to:
   concurrently transmit data in a data portion of the wireless frame that follows the second logical portion as part of a cooperative transmission.

3. The eNB of claim 2 wherein the wireless frame is an OFDMA downlink subframe,
   wherein the CSI-RSs are concurrently transmitted by the nodes and the eNB in the second logical portion, and
   wherein the eNB configures the nodes to perform cooperative OFDMA transmission techniques for one or more UEs operating in the cell.

4. The eNB of claim 1 wherein the PRS is broadcast by the eNB, and
wherein each of the CSI-RSs are transmitted in a region of a physical downlink shared channel (PDSCH).

5. The eNB of claim 1 wherein the eNB is arranged to:
transmit a first CSI-RS with a first UE-specific scrambling code; and
instruct each of the RRHs to transmit a CSI-RS with different UE-specific scrambling codes.

6. The eNB of claim 5 wherein all the CSI-RSs are transmitted within same resource elements of a resource block that is concurrently transmitted by the eNB and the RRHs.

7. The eNB of claim 5 wherein the eNB is arranged to:
transmit the first CSI-RS on a first set of resource elements; and
instruct each of the RRHs to transmit an associated CSI-RS, at least in part, on a different set of resource elements of a resource block that is concurrently transmitted by the eNB and the RRHs.

8. The eNB of claim 1 wherein the eNB is arranged to:
transmit a first CSI-RS with a cell-specific scrambling code;
instruct each of the RRHs to transmit a CSI-RS with the cell-specific scrambling code; and
wherein the eNB is arranged to:
transmit the first CSI-RS on a first set of resource elements; and
instruct each of the RRHs to transmit an associated CSI-RS, at least in part, on a different set of resource elements of a resource block that is concurrently transmitted by the eNB and the RRHs.

9. The eNB of claim 1 wherein the eNB is arranged to provide a location service (LCS) to the UE based on the updated location estimate information.

10. The eNB of claim 1 wherein the eNB is arranged to request one or more neighboring eNBs to apply PDSCH muting to CSI-RS subcarriers when the UE is unable to accurately update its initial location estimate using the CSI-RSs.

11. The eNB of claim 1 wherein the eNB is arranged to
use the feedback indicative of channel estimates for multiple-input multiple-output (MIMO) beamforming for configuring a cooperative transmission to the mobile station; and
use the location estimate information to provide a location-based service to the mobile station.

12. User Equipment (UE) arranged for receipt of cooperative orthogonal frequency division multiple access (OFDMA) transmissions from an enhanced Node-B (eNB) and one or more remote radio heads (RRHs) of a cell,
wherein the UE is arranged to:
receive a UE-specific reference signal from the eNB, a cell-specific reference signal comprising a channel state information reference signal (CSI-RS) from a current cell and a cell-specific reference signal comprising a positioning reference signal (PRS) from one or more neighbor cells;
receive UE-specific reference signals from one or more of the RRHs, each of the UE-specific reference signals from each of the one or more of the RRHs being distinguishable from each of the UE-specific reference signals from each other RRH of the one or more of the RRHs and from the UE-specific reference signal received from the eNB;
generate a location estimate at least in part from the UE-specific reference signals;
determine an initial location estimate from the cell-specific reference signal;
update the location estimate using the UE-specific reference signals;
perform channel estimations using the CSI-RS from the eNB and the CSI-RSs from each of the RRHs;
report an updated location estimate to the eNB; and
provide feedback to the eNB indicative of the channel estimations for use by the eNB and the RRHs for cooperative OFDMA transmissions.

13. A method performed by an enhanced Node-B (eNB) arranged to operate as part of a distributed antenna system (DAS) comprising one or more nodes having a same cell identifier (ID) and operating within a same cell as the eNB, the method comprising:
transmitting a user equipment (UE)-specific reference signal and a cell-specific reference signal comprising a positioning reference signal (PRS);
configuring one or more of the other nodes of a cell to transmit UE-specific reference signals comprising a channel state information reference signal (CSI-RS), each of the UE-specific reference signals transmitted by each of the one or more of the other nodes of the cell being distinguishable from each of the UE-specific reference signals transmitted by each other node of the one or more of the other nodes of the cell and from the UE-specific reference signal that is transmitted by the eNB, the nodes comprising remote radio heads (RRHs); and
receiving location estimate information from a UE that is determined at least in part from the UE-specific reference signals and the cell-specific reference signal, the location estimate information comprising an initial location estimate obtained using the received PRS and a PRS received from of one or more other cells, an update of the initial location estimate obtained using the received CSI-RS from the eNB and the CSI-RSs received from the RRHs of the cell, and feedback indicative of channel estimations, obtained using the CSI-RS from the eNB and the CSI-RSs from one or more of the RRHs, for use by the eNB and the RRHs for cooperative OFDMA transmissions.

14. The method of claim 13 wherein:
the PRS is transmitted in a first logical portion of a wireless frame, and the CSI-RSs are transmitted in a second logical portion of the frame,
the eNB and the nodes are arranged to concurrently transmit data in a data portion of the wireless frame that follows the second logical portion as part of a cooperative transmission, and
the wireless frame is an OFDMA downlink subframe.

15. The method of claim 14 wherein the CSI-RSs are concurrently transmitted by the nodes and the eNB in the second logical portion of the wireless frame.

16. The method of claim 14 wherein the location estimate information from the UE is determined by the UE based on the cell-specific reference signal in addition to the UE-specific reference signals.

17. The eNB of claim 1 wherein the eNB is further arranged to configure a subset of fewer than all of the one or more nodes in the cell to transmit distinguishable CSI-RSs.

18. The eNB of claim 17 wherein the eNB is further arranged to select the one or more nodes in the subset based on channel propagation conditions of the one or more nodes with the UE.

19. The eNB of claim 1 wherein the eNB configures the nodes to perform cooperative OFDMA transmission techniques for one or more UEs operating in the cell, and the OFDMA transmission techniques include coordinated multipoint (CoMP) transmissions.

20. The UE of claim 12 wherein the UE is arranged to receive a location service (LCS) from the eNB based on the updated location estimate information.

21. A non-transitory machine readable medium comprising instructions that, when executed by a user equipment (UE), cause the UE to perform operations to receive cooperative orthogonal frequency division multiple access (OFDMA) transmissions from an enhanced Node-B (eNB) and one or more remote radio heads (RRHs) of a cell, the operations comprising:

receiving a UE-specific reference signal from the eNB, a cell-specific reference signal comprising a channel state information reference signal (CSI-RS) from a current cell and a cell-specific reference signal comprising a positioning reference signal (PRS) from one or more neighbor cells;

receiving UE-specific reference signals from one or more of the RRHs, each of the UE-specific reference signals from each of the one or more of the RRHs being distinguishable from each of the UE-specific reference signals from each other RRH of the one or more of the RRHs and from the UE-specific reference signal received from the eNB;

generating a location estimate at least in part from the UE-specific reference signals;

determining an initial location estimate from the cell-specific reference signal;

updating the location estimate using the UE-specific reference signals;

performing channel estimations using the CSI-RS from the eNB and the CSI-RSs from each of the RRHs;

reporting an updated location estimate to the eNB; and providing feedback to the eNB indicative of the channel estimations for use by the eNB and the RRHs for cooperative OFDMA transmissions.

22. The medium of claim 21 wherein operations further comprise receiving a location service (LCS) from the eNB based on the updated location estimate information.

* * * * *